Figure 1:
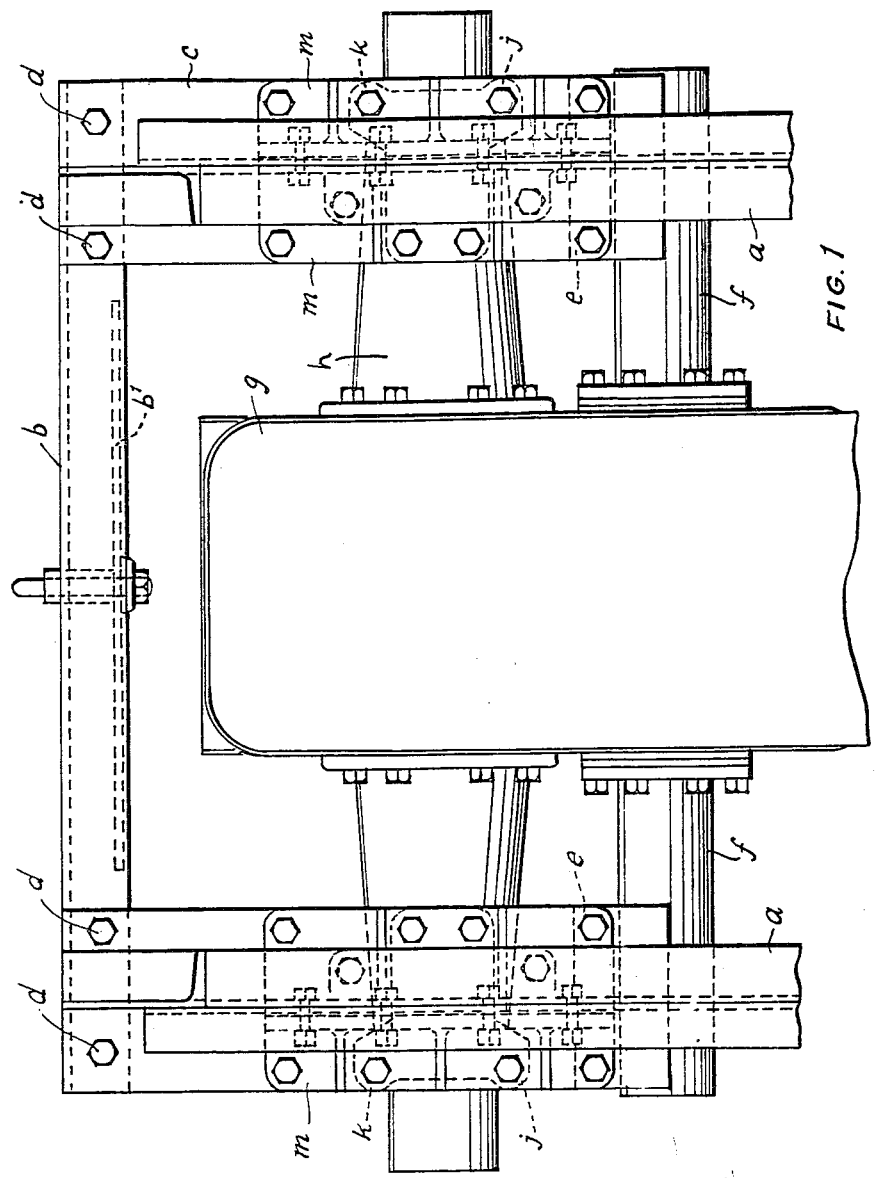

April 10, 1956 W. F. McCAW 2,741,492
MOUNTING OF A SECOND CHASSIS OR OTHER SUPERSTRUCTURE
ON A UNIT CONSTRUCTION CHASSIS
Filed Feb. 11, 1953 4 Sheets-Sheet 4

INVENTOR
WILLIAM F. McCAW
BY *Stc Bierman*
ATTORNEY

United States Patent Office 2,741,492
Patented Apr. 10, 1956

2,741,492

MOUNTING OF A SECOND CHASSIS OR OTHER SUPERSTRUCTURE ON A UNIT CONSTRUCTION CHASSIS

William Fergusson McCaw, Manchester, England, assignor to E. Boydell & Co. Limited, Old Trafford, Manchester, England Application February 11, 1953, Serial No. 336,407

Claims priority, application Great Britain February 15, 1952

5 Claims. (Cl. 280—106)

This invention relates to the mounting of a second chassis or other superstructure on a unit construction chassis such as are made primarily for use as farm tractors and for like purposes. The expression unit construction chassis is used to define a chassis which has no chassis frame but in which the casings of the parts respectively of the back axle, gear box, clutch housing and engine crackcase are secured together collectively to form the chassis.

Such unit construction chassis have for many years been adapted for many different purposes, for example to produce a load-carrying vehicle known as a "dumper" by mounting a second chassis thereon so as to carry the tipping bucket. Another use is to attach thereto the basic superstructure of a mechanical shovel. For such or like purposes the said superstructure has to be secured to the chassis and this is effected by brackets or the like rigidly fitting onto the outer ends of the drive axle casing. The main disadvantage of such construction is the additional loads or stresses which are thereby imposed on the said casing and the other casing parts of the unit chassis for which such parts were not designed, and as a result of which fractures are liable to occur.

The object of the present invention is an improved method of and means for attaching a superstructure to a unit construction chassis and particularly to the drive axle casing so as to relieve the latter of at least a substantial proportion of the aforesaid additional stresses or to transfer them to other parts of the chassis better adapted to withstand them. The invention is particularly, though not exclusively concerned with the additional bending and tensional stresses to which the drive axle casing is subjected when a unit construction chassis is adapted for use as a dumper.

According to the invention means for strengthening a unit construction chassis to enable it to carry a superstructure comprising a U-shaped dead axle assembly consisting of a cross girder member arranged on edge behind the driving axle casing of the chassis, forwardly extending upper and lower plate-like members rigidly secured to the ends of the said cross member and means for securing said plate-like members to the ends of, and respectively above and below the axle casing of the chassis, whereby bending stresses increased by the superstructure load and normally transmitted by the ends of the axle casing to the whole casing, are in part absorbed by the said dead axle assembly.

According to a further feature of the invention, said longitudinal members are extended on the other side of the drive axle casing and so attached to a relatively remote part of the unit chassis as to be capable of absorbing and dispersing stresses from the superstructure which would otherwise have to be absorbed by the axle casing and relatively adjacent portion of the unit chassis.

Figure 2:
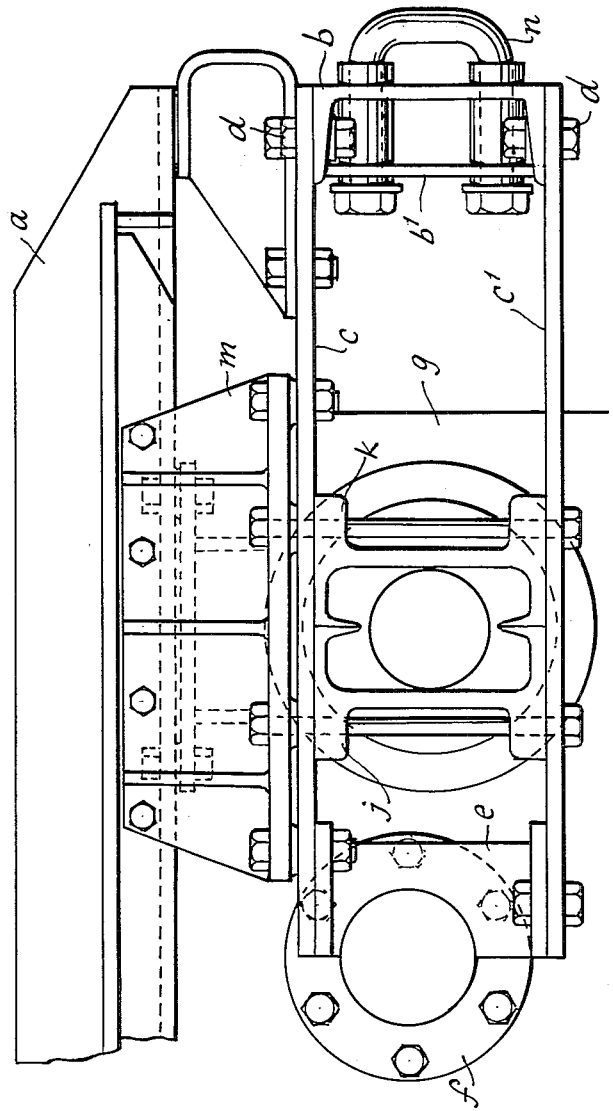
Figure 3:
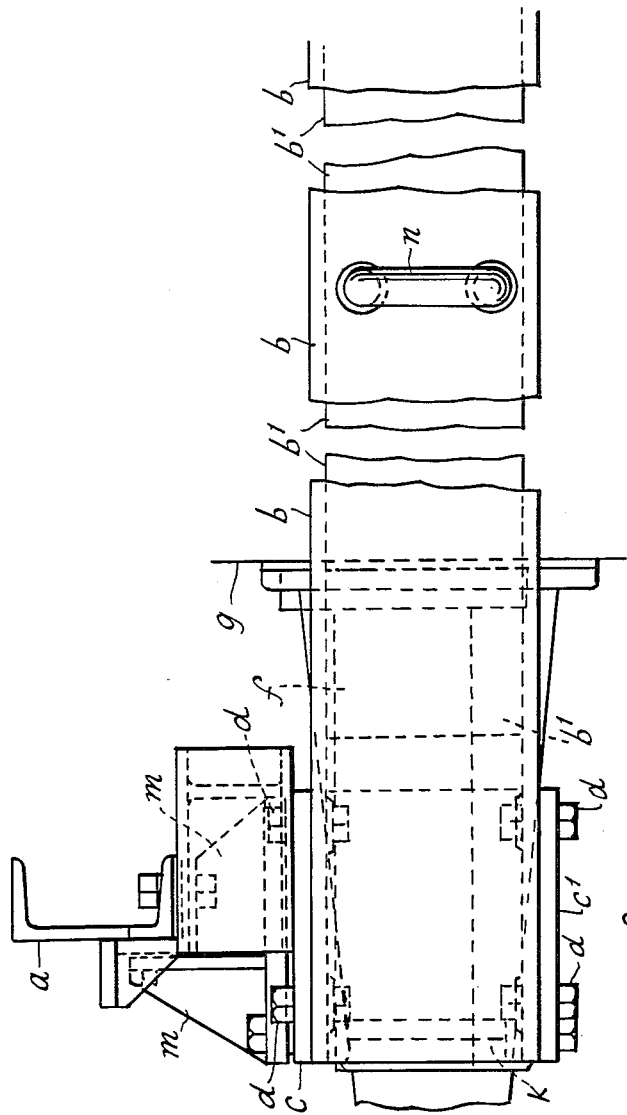
Figure 4:
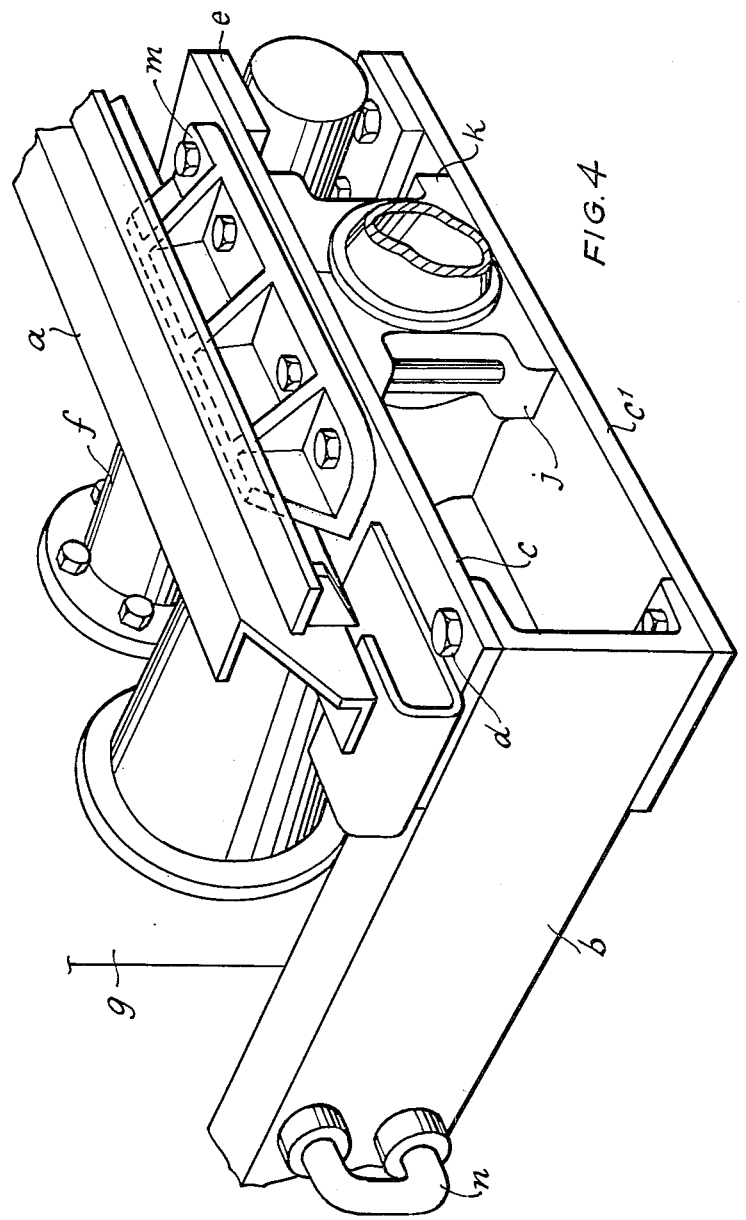

In the accompanying drawings:

Fig. 1 is a plan view of one side of a dead axle construction made in accordance with the present invention;
Fig. 2 is a side view of the construction shown in Fig. 1;
Fig. 3 is a broken end view giving further details;

Fig. 4 is a part perspective view showing the dead axle in position on a dumper.

In one example of the invention dead axle mounting means for the secondary chassis of a dumper, principally the main longitudinal rails $a$ to carry a tipping bucket, not shown, consists of a cross girder member $b$ of channel section, arranged on edge, and pairs of upper and lower plate-like longitudinal supporting members $c, c'$ secured by bolts $d$ through their rear ends to the flanges of the cross member $b$ at its ends. At their forward ends such plates carry channel members $e$ secured between the upper and lower plate-like members, with the base portions of their channels lying in a vertical longitudinal plane, said base portions being each notched at their forward edges to engage a stub support $f$ bolted to the side $g$ of the unit chassis on the forward side of the drive axle casing $h$. Between their ends, the plates $c, c'$ are adapted to be clamped rigidly to the ends of the drive axle casing, by a pair of channel shaped clamps $j, k$ adapted to form a hollow box-like unit to embrace the end of the axle casing and to the flanges of which the plates $c, c'$ are bolted one above and one below the same. The plates $c, c'$ are relatively wide and spaced to provide torsional stiffness.

In use, bending stresses normally transmitted by the ends of the axle casing to the whole casing, are also transmitted to the plates $c, c'$ and are largely absorbed by the stiffness thereof and by the cross member $b$. The forward attachment of these plate members to the unit chassis through the stub supports $f$ also helps to relieve the rear portion of the chassis, and especialy the axle casing and its attachment to the rest of the chassis, of bending and other stresses which are otherwise increased by the addition of the superstructure and load. A stiffner $b'$ is shown welded to the cross member $b$ and the usual rear stirrups $n$ are provided but attached to the dead axle cross member, to provide a towing hitch.

An important feature is that no accommodation for differential movement is required to be made to the original load-carrying or driving axles inasmuch as this second dead axle is floating or positioned independently of and not in any constrained relationship to the tractor main structure.

I claim:

1. Means for strengthening a unit-construction chassis to enable it to carry a superstructure comprising a U-shaped dead axle assembly comprising a cross girder mounted on its edge, upper and lower plate-like members rigidly secured at their ends to one end of said cross girder and extending forwardly, a stub support having its end secured between the forward ends of said members and extending laterally to form a U with said cross girder and members, an axle casing secured to the base of said U, and an axle mounted in said casing within said U.

2. Means for strengthening a unit construction chassis to enable it to carry a superstructure comprising a U-shaped dead axle assembly consisting of a cross girder member arranged on edge behind the driving axle casings of the chassis, forwardly extending upper and lower plate-like members rigidly secured to the ends of said cross girder member and extending forwardly of said axle casings, means for securing said plate-like members to the ends of and respectively above and below said axle casings of the chassis, and connecting means for connecting the forward ends of said members to a part of the chassis adjacent said axle casings.

3. Means for strengthening a unit construction chassis to enable it to carry a superstructure comprising a U-shaped dead axle assembly consisting of a cross girder member arranged on edge behind the driving axle casings of the chassis, forwardly extending upper and lower plate-like members rigidly secured to the ends of said cross girder member and extending forwardly of said axle casings, means for securing said plate-like members to the ends of and respectively above and below said axle casings, channel members secured, with their base portions lying in vertical longitudinal planes between the forward ends of the upper and lower plate at each side of said chassis, said base portions each having a notch in its forward end, and stub supports adapted to be secured to said chassis and to be engaged with said notches.

4. Means for strengthening a unit construction chassis to enable it to carry a superstructure comprising a U-shaped dead axle assembly consisting of a cross girder member arranged on edge behind the driving axle casings of the chassis, forwardly extending upper and lower plate-like members rigidly secured to the ends of said cross girder member and extending forwardly of said axle casings, means for securing said plate-like members to the ends of and respectively above and below said axle casings, channel members secured, with their base portions lying in vertical longitudinal planes between the forward ends of the upper and lower plate at each side of said chassis, said base portions each having a notch in its forward end, and stub supports adapted to be secured to said chassis forward of the axle casings and adjacent thereto and to be engaged with said notches.

5. Means for strengthening a unit construction chassis comprising a U-shaped dead axle tractor assembly consisting of a cross girder member arranged on end behind the driving axle casings of the chassis, forwardly extending upper and lower plate-like members rigidly secured to the ends of said cross girder member and extending forwardly of said axle casings, channel shaped clamps on said plate-like members adapted to form a box-like unit to embrace the ends of said axle casings so as to secure said plate-like members to said ends of and respectively above and below said axle casings, channels members secured, with their base portions lying in vertical longitudinal planes between the forward ends of the upper and lower plates at each side of said chassis, said base portions each having a notch in its forward end, and stub supports adapted to be secured to said chassis and to be engaged with said notches.

References Cited in the file of this patent
UNITED STATES PATENTS

| | | |
|---|---|---|
| 1,353,156 | Ford | Sept. 21, 1920 |
| 1,779,142 | Osman | Oct. 21, 1930 |
| 1,833,405 | Bock | Nov. 24, 1931 |
| 2,143,726 | Acton | Jan. 10, 1939 |